United States Patent
Wang et al.

(10) Patent No.: US 7,583,182 B2
(45) Date of Patent: Sep. 1, 2009

(54) LANE DEPARTURE WARNING METHOD AND APPARATUS

(75) Inventors: Yu-Long Wang, Tainan (TW);
Yung-Sheng Liao, Taipei County (TW);
Chin-Shen Yeh, Hsinchu County (TW);
Sian-Chiang Liu, Taoyuan County (TW)

(73) Assignee: Industrial Technology Research Institute, HsinChu (TW)

( * ) Notice: Subject to any disclaimer, the term of this patent is extended or adjusted under 35 U.S.C. 154(b) by 345 days.

(21) Appl. No.: 11/751,473

(22) Filed: May 21, 2007

(65) Prior Publication Data

US 2008/0143509 A1 Jun. 19, 2008

(30) Foreign Application Priority Data

Dec. 13, 2006 (TW) .............................. 95146602 A

(51) Int. Cl.
*B60Q 1/00* (2006.01)
(52) U.S. Cl. .................... 340/436; 340/435; 340/903; 340/471; 701/301
(58) Field of Classification Search ................ 340/436, 340/435, 437, 901, 903, 471; 348/148; 701/301, 701/93, 96; 180/197, 282, 271
See application file for complete search history.

(56) References Cited

U.S. PATENT DOCUMENTS 6,405,132 B1 * 6/2002 Breed et al. ................. 701/301
6,889,171 B2 * 5/2005 Skrbina et al. ............... 702/187
7,194,347 B2 * 3/2007 Harumoto et al. ............. 701/45

FOREIGN PATENT DOCUMENTS

| JP | 11175702 | 7/1999 |
|----|----------|--------|
| JP | WO2005023588 | 3/2005 |
| JP | 2005136946 | 5/2005 |
| TW | 1228086 | 2/2005 |
| TW | 1245715 | 12/2005 |

* cited by examiner

*Primary Examiner*—Anh V La
(74) *Attorney, Agent, or Firm*—WPAT, PC; Justin I. King

(57) ABSTRACT

The present invention discloses a lane departure warning method, which functions to choose the data acquiring source according to brightness of the environment surrounding a vehicle and weather status so as to reduce the erroneous judgment of lane departure during image processing and analyzing. In addition, the present invention also presents a lane departure warning apparatus using the foregoing method, which comprises at least a first information acquisition unit, at least a second information acquisition and a information processing/information processing/controlling unit. The first information acquisition unit disposed on the vehicle is capable of capturing the image around the vehicle while the second information acquisition unit disposed on the bottom of the vehicle is capable of capturing image under the bottom of the vehicle. The image acquired from the first information acquisition unit and the second information acquisition unit is then sent to the processing and information processing/controlling unit for data processing.

21 Claims, 6 Drawing Sheets

130 — while the environment evaluation indicates normal, using the image information acquired by the at least one first information acquisition unit to evaluate distances between the vehicle and traffic lanes, and using the image information acquired by the at least one second information acquisition unit to perform an evaluation for determining whether the traffic lane is pressed by the vehicle 131 — while the environment evaluation indicates abnormal, using the image information acquired by the at least one second information acquisition unit to perform an evaluation for determining whether the traffic lane is pressed by the vehicle

FIG. 1B

LANE DEPARTURE WARNING METHOD AND APPARATUS

FIELD OF THE INVENTION

The present invention relates to an alerting method and apparatus, and more particularly, to a lane departure warning method and apparatus for automatically detecting unintended lane departures of a vehicle that is free from making an erroneous judgment affected by the ambient environment of the vehicle since it is able to acquire accurate information about the ambient environment.

BACKGROUND OF THE INVENTION

According to the statistics provided by the Department of Statistics, Ministry of Transportation and Communications, Republic of China, the primary cause of the A-1 class fatal traffic accidents in Taiwan had been "careless driving" for three successive years, i.e. from year 2001 to year 2003. It is, therefore, concluded that most traffic accidents are caused by human errors. That is, a traffic accident can simply be resulted from a tried, a careless, or a distracted driver, since it is hard for a driver to keep alert all the time as she/he can be easily distracted by all kinds of things. Drivers that are easily distracted and careless usually are not capable of driving his/her way out of an accident.

Hence, a driving assistance system capable of detecting and tracking traffic lane in real time for measuring an amount of deviation of a vehicle carrying the system can be very helpful for accident prevention. One such system is disclosed in EPC Pat. No. WO2005023588, entitled "Detection of Unintended Lane Departures", which employs an image processing and identification technique for evaluating lane departures of a vehicle and thus issuing a alarm to alert the driver if an abnormal lane departure is detected.

However, although the aforesaid method can assist a drive to avoid the condition of unintended lane departures, the accuracy of its evaluation can be adversely affected by weathers. For instance, when driving in a raining night and water begins to accumulate on the road, images of the road captured by cameras of the aforesaid method might be contaminated by the light of the street lamps or vehicle lamps reflected from water patches on the road, and thus the detection of the aforesaid method based on such contaminated images could be erroneous. It is noted that such weather-affected errors could happen no matter the camera is using charge-coupled device (CCD) or complementary metal-oxide semiconductor (CMOS) device for image capturing.

Therefore, it is in need of a lane departure warning method and apparatus for automatically detecting unintended lane departures of a vehicle that is capable of accurately interpreting images affected by weather or ambient environment of the vehicle and thus is free from making erroneous judgments similar to the prior arts.

SUMMARY OF THE INVENTION

It is the primary object of the present invention to provide a lane departure warning method and apparatus, for automatically detecting lane departures of a vehicle, capable of interpreting and evaluating the ambient environment of the vehicle to generate an accurate lane departure information while using the lane departure information to provide a judgment freed from the affection of the ambient environment.

It is another object of the invention to provide a lane departure warning method and apparatus for automatically detecting lane departures of a vehicle, having at least two image sources, capable of selectively using one of the at least two image sources as it identification source for lane departure detection basing on an ambient environment evaluation and an weather status evaluation so that the accuracy of the lane departure detection performed thereby is improved.

Yet, another object of the invention to provide a lane departure warning method and apparatus for automatically detecting lane departures of a vehicle, which can improve its lane departure detection accuracy by configuring additional image capturing devices at the bottom of the vehicle.

Furthermore, another object of the invention to provide a lane departure warning method and apparatus for automatically detecting lane departures of a vehicle, capable of issuing an alarm signal to alert the driver of the vehicle.

To achieve the above objects, the present invention provides a lane departure warning method for automatically detecting lane departures of a vehicle, comprising the steps of: providing at least a first information acquisition unit and at least a second information acquisition unit, while enabling each of the at least one first information acquisition unit to acquire information relating to an environment surrounding the vehicle, and each of the at least one second information acquisition unit to be being disposed at the bottom of the vehicle for acquiring information relating to the ambient of the vehicle's bottom; using the image information acquired by the at least one first information acquisition unit to generate an image signal; performing an environment evaluation upon the image signal for interpreting and defining the ambient environment of the vehicle; and basing on the interpretation of the environment evaluation to select one acquired information from the group consisting of the information acquired by the at least one first information acquisition unit, the information acquired by the at least one second information acquisition unit, and the combination thereof while using the selected information to perform a lane departure evaluating process.

Preferably, the lane departure warning method further comprise the step of:

generating an alarm signal while the lane departure evaluating process indicate an occurrence of lane departure.

Preferably, the lane departure warning method further comprise the step of:

recording the result of the lane departure evaluating process.

Preferably, the environment evaluation further comprises the steps of: evaluating the brightness of a surrounding ambient to the vehicle; and evaluating weather status of the environment surrounding the vehicle. In which, the brightness evaluation is performed by performing an average operation upon gray levels of the image information acquired by the at least one first information acquisition unit while defining an surrounding brightness according to the average operation; and the weather status evaluation is performed by using the image information acquired by the at least one first information acquisition unit to perform a rain drop identification or by using a frequency sensor to measuring the wiping frequency of a windshield wiper of the vehicle.

Preferably, the lane departure evaluating process further comprises the steps of: while the environment evaluation indicates normal, using the image information acquired by the at least one first information acquisition unit to evaluate distances between the vehicle and traffic lanes, and using the image information acquired by the at least one second information acquisition unit to perform an evaluation for determining whether the traffic lane is pressed by the vehicle.

Preferably, the lane departure evaluating process further comprises the step of: while the environment evaluation indicates abnormal, using the image information acquired by the at least one second information acquisition unit to perform an evaluation for determining whether the traffic lane is pressed by the vehicle.

To achieve the above object, the present invention provides a lane departure warning apparatus for automatically detecting lane departures of a vehicle, comprising: at least a first information acquisition unit, for acquiring information relating to an environment surrounding the vehicle; at least a second information acquisition unit, being disposed at the bottom of the vehicle for acquiring information relating to the ambient of the vehicle's bottom; an information processing/controlling unit, coupled to each first information acquisition unit and each second information acquisition unit, capable of using an environment evaluation module to evaluate brightness of the ambient environment of the vehicle and thus basing upon the evaluation to select one acquired information from the group consisting of the information acquired by the at least one first information acquisition unit, the information acquired by the at least one second information acquisition unit, and the combination thereof, while processing the selected information to generate an alarm signal; and an alarm unit, capable of receiving the alarm signal and thus generate an alerting response accordingly.

Preferably, the environment evaluation module further comprises: a brightness evaluation module, used for evaluating the brightness of a surrounding environment ambient to the vehicle; and a weather status evaluation module, used for evaluating weather status of the environment surrounding the vehicle. In which, the brightness evaluation module is able to perform an average operation upon gray levels of the image information acquired by the at least one first information acquisition unit while defining an surrounding brightness according to the average operation; and the weather status evaluation module is able to determine whether or not it is raining by one means selected form the group consisting of: performing a rain drop identification using the image information acquired by the at least one first information acquisition unit, and measuring the wiping frequency of a windshield wiper of the vehicle using a frequency sensor.

Preferably, each of the at least one first information acquisition unit can be disposed at a position of the vehicle selected from the front of the vehicle, the rear of the vehicle, the two sides of the vehicle.

Preferably, each of the at least one first information acquisition unit can be a camcorder, which embedded with an image capturing device selected from the group consisting of a CCD and a CMOS.

Preferably, each of the at least one second information acquisition unit can be a camcorder, which embedded with an image capturing device selected from the group consisting of a CCD and a CMOS.

Preferably, each of the at least one first information acquisition unit can be an infrared image capturing device. Moreover, the infrared image capturing device can be comprised of an infrared projector and an infrared sensor.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 1B is a flow chart depicting steps of a lane departure evaluating process used in a lane departure warning method of the invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1A:
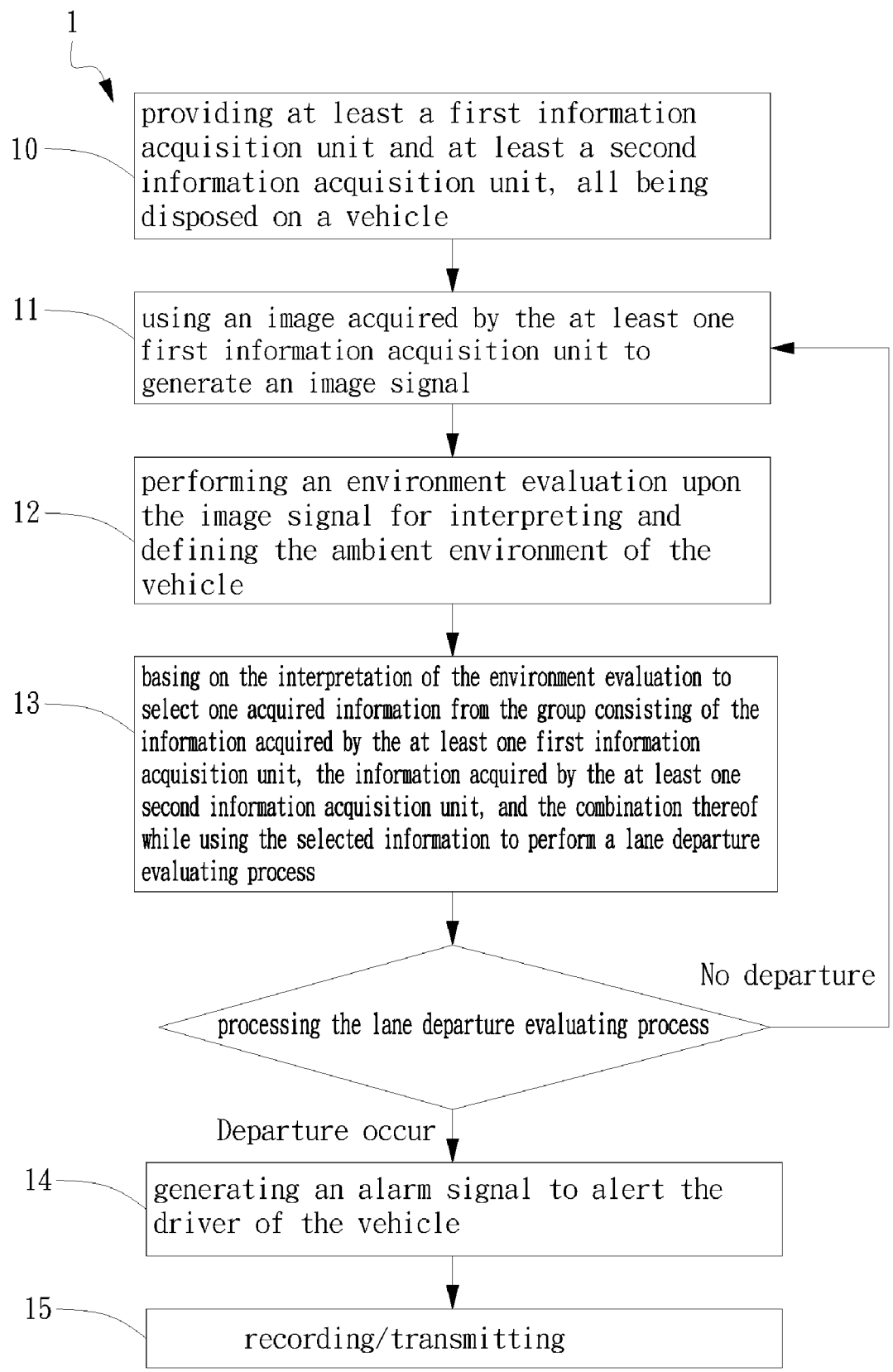
FIG. 1A is a flow chart depicting steps of a lane departure warning method for automatically detecting lane departures of the invention.

Please refer to FIG. 1A, which is a flow chart depicting steps of a lane departure warning method for automatically detecting lane departures of the invention. The lane departure warning method, adapted for a vehicle, starts at step 10. At step 10, at least a first information acquisition unit and at least a second information acquisition unit are provided, whereas each of the at least one first information acquisition unit is enabled to acquire information relating to an environment surrounding the vehicle, and each of the at least one second information acquisition unit, being disposed at the bottom of the vehicle, is enabled to acquire information relating to the ambient of the vehicle's bottom, and then the flow proceeds to step 11.

Figure 2:
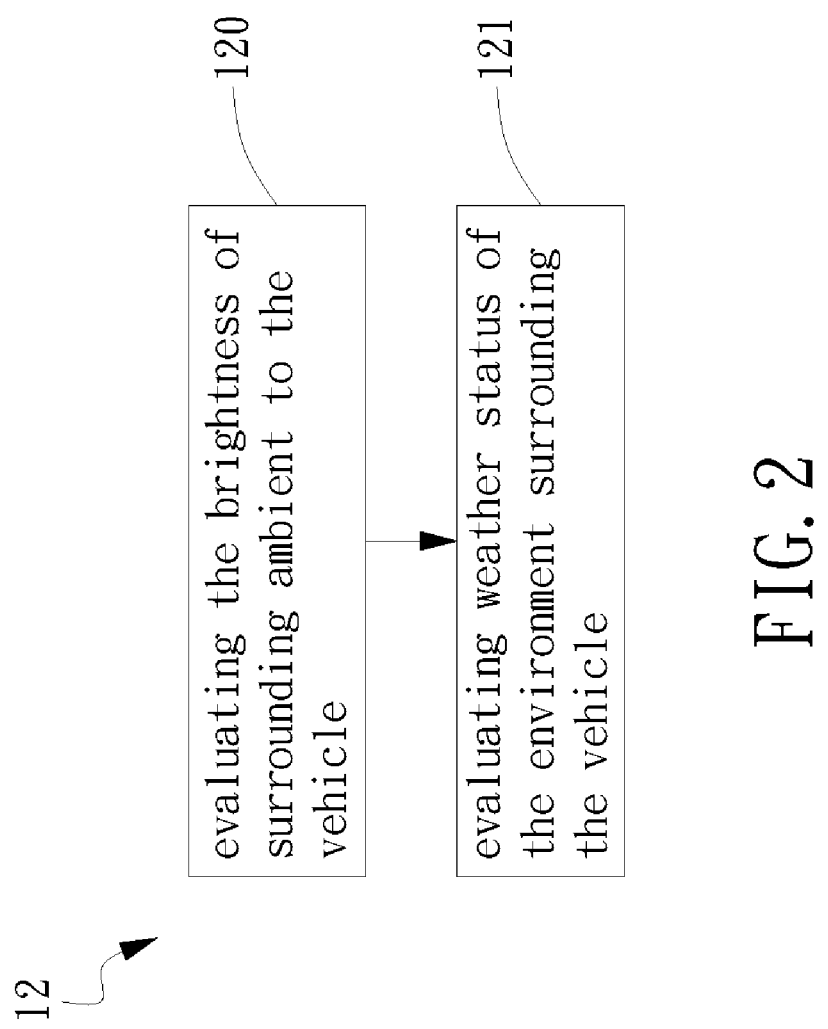
FIG. 2 is a flow chart depicting steps of an environment evaluation used in a lane departure warning method of the invention.

At step 11, the image information acquired by the at least one first information acquisition unit is processed for generating an image signal, and then the flow proceeds to step 12, At step 12, an environment evaluation is performed upon the image signal for interpreting and defining the ambient environment of the vehicle, and then the flow proceeds to step 13. In a preferred aspect, as seen in FIG. 2, the environment evaluation further comprises the step 120 and the step 121, whereas at step 120, the brightness of a surrounding ambient to the vehicle is evaluated; at step 121, weather status of the environment surrounding the vehicle is evaluated. In which, the brightness evaluation is performed by performing an average operation upon gray levels of the image information acquired by the at least one first information acquisition unit while defining an surrounding brightness according to the average operation; and the weather status evaluation is performed by using the image information acquired by the at least one first information acquisition unit to perform a rain drop identification or by using a frequency sensor to measuring the wiping frequency of a windshield wiper of the vehicle.

Back up step 13 of FIG. 1A, basing on the interpretation of the environment evaluation, one acquired information is selected from the group consisting of the information acquired by the at least one first information acquisition unit, the information acquired by the at least one second information acquisition unit, and the combination thereof so as to use the selected information for performing a lane departure evaluating process; and then the flow proceeds to step 14. The principle of the step 13 is basically using the result of the environment evaluation as basic for selecting images between those acquired by the first information acquisition unit and those by the second information acquisition unit in terms of enhancing image identification accuracy. For instance, when driving in a sunny day, images acquired by the first information acquisition unit is used for the lane departure evaluating process; and on the other hand, when driving in a raining day, or at night, images acquired by the second information acquisition unit is used for the lane departure evaluating process.

As seen in FIG. 1B, the lane departure evaluating process comprises two steps 130 and 131, and is starts at step 130. At step 130, while the environment evaluation indicates normal, using the image information acquired by the at least one first information acquisition unit to evaluate distances between the vehicle and traffic lanes, and using the image information acquired by the at least one second information acquisition unit to perform an evaluation for determining whether the traffic lane is pressed by the vehicle. At step 131, while the environment evaluation indicates abnormal, using the image information acquired by the at least one second information acquisition unit to perform an evaluation for determining whether the traffic lane is pressed by the vehicle.

Back up step 14 of FIG. 1A, an alarm signal is generated for alerting the driver of the vehicle while the lane departure evaluating process indicate an occurrence of lane departure, and then the flow proceeds to step 15; otherwise the flow proceeds back to step 11. At step 15, the result of the lane departure evaluating process is registered and then transmitted to a control center for recording.

Figure 3:
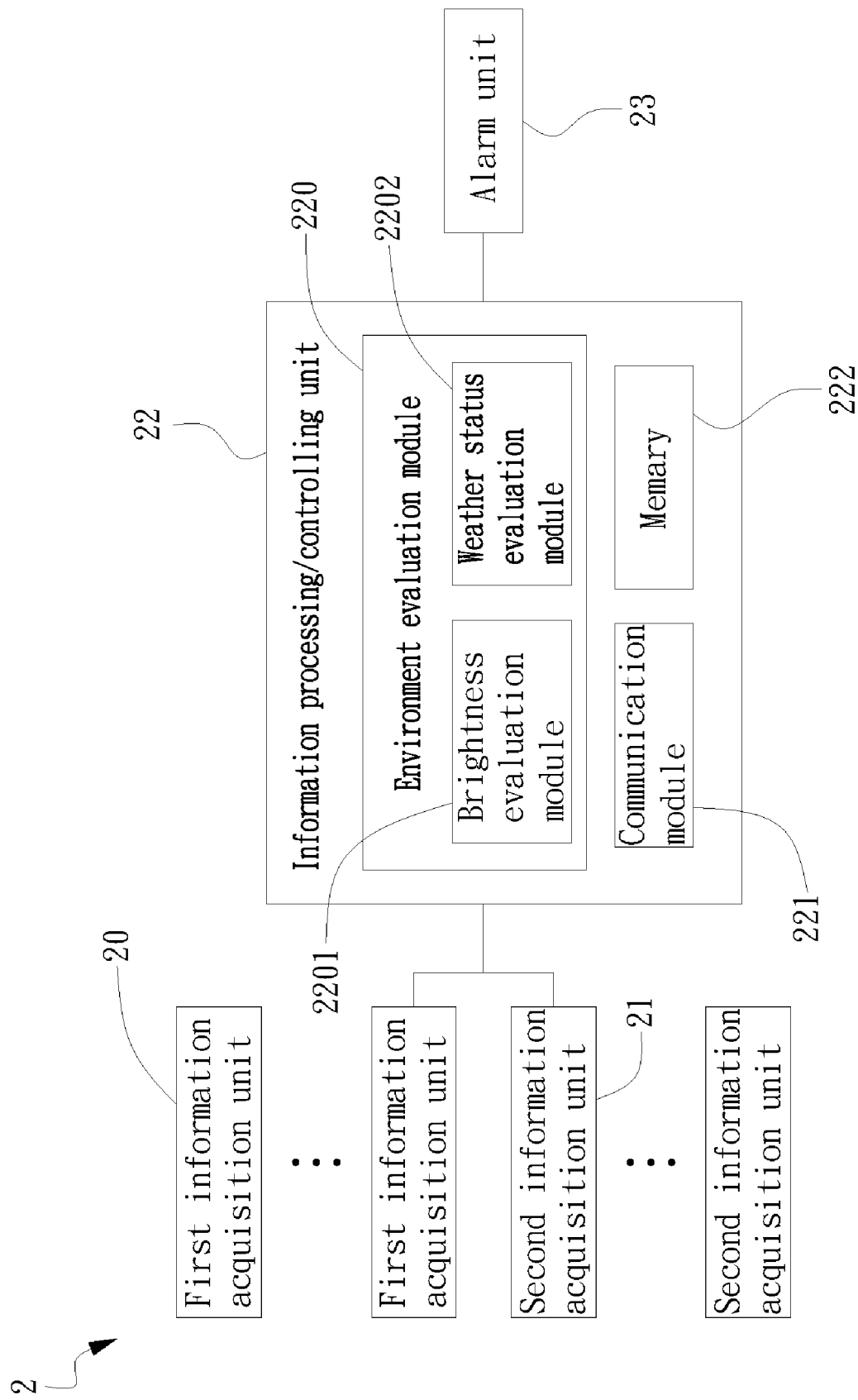
FIG. 3 is a schematic diagram showing a lane departure warning apparatus of the invention.

With the aforesaid lane departure warning method, a lane departure warning apparatus for automatically detecting lane departures of a vehicle can be provided, as seen in FIG. 3. In FIG. 3, the lane departure warning apparatus is comprised of: at least a first information acquisition unit 20, at least a second information acquisition unit 21, an information processing/controlling unit 22 and an alarm unit 23. In a preferred aspect, each first information acquisition unit 20, used for acquiring information relating to an environment surrounding the vehicle, can be a camcorder configuring with an image capturing device selected from the group consisting of a charge-coupled device (CCD) and a complementary metal-oxide semiconductor (CMOS).

Figure 4A:
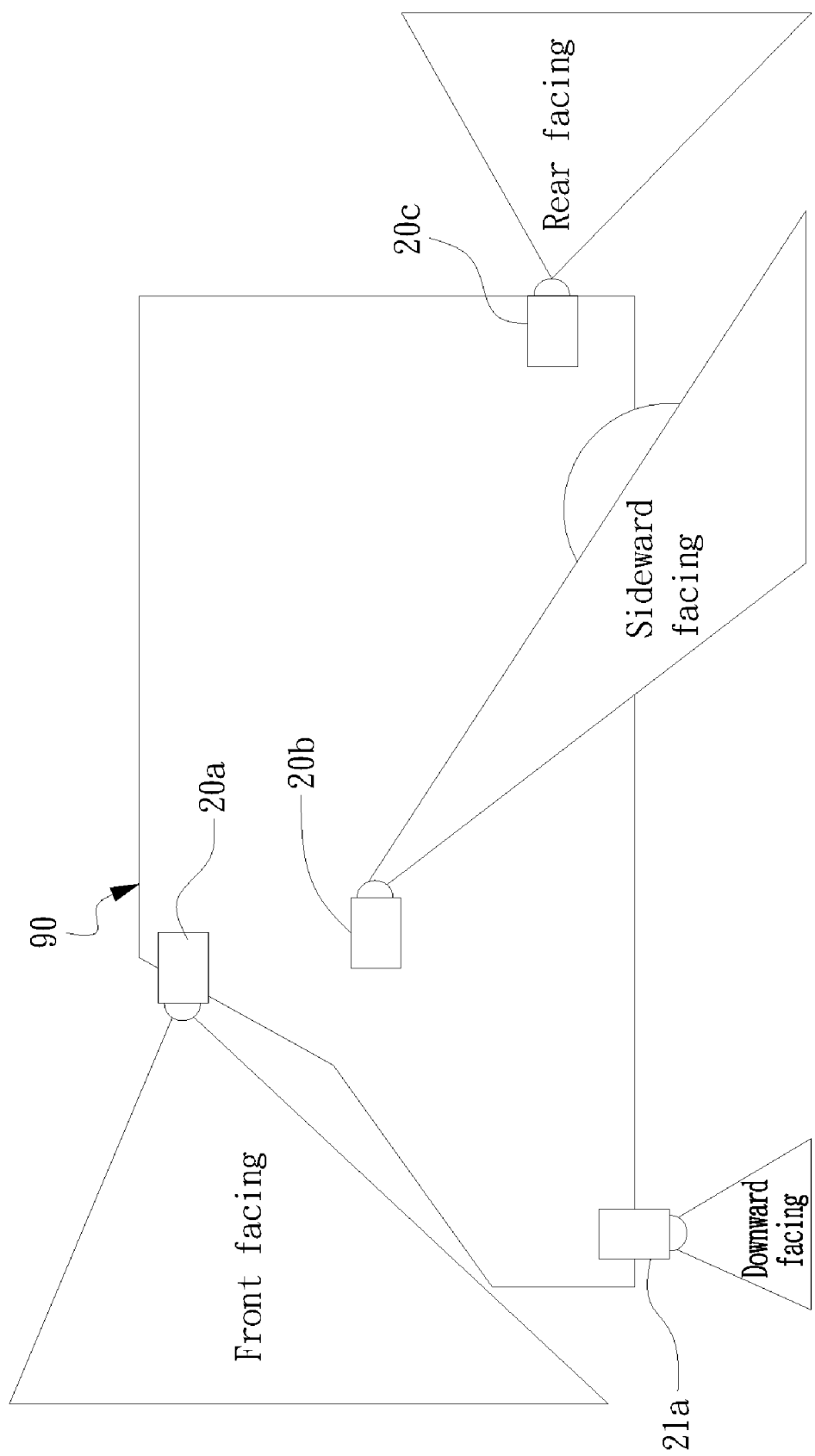
FIG. 4A is a side view of a lane departure warning apparatus of the invention, being adapted for a vehicle.
Figure 4B:
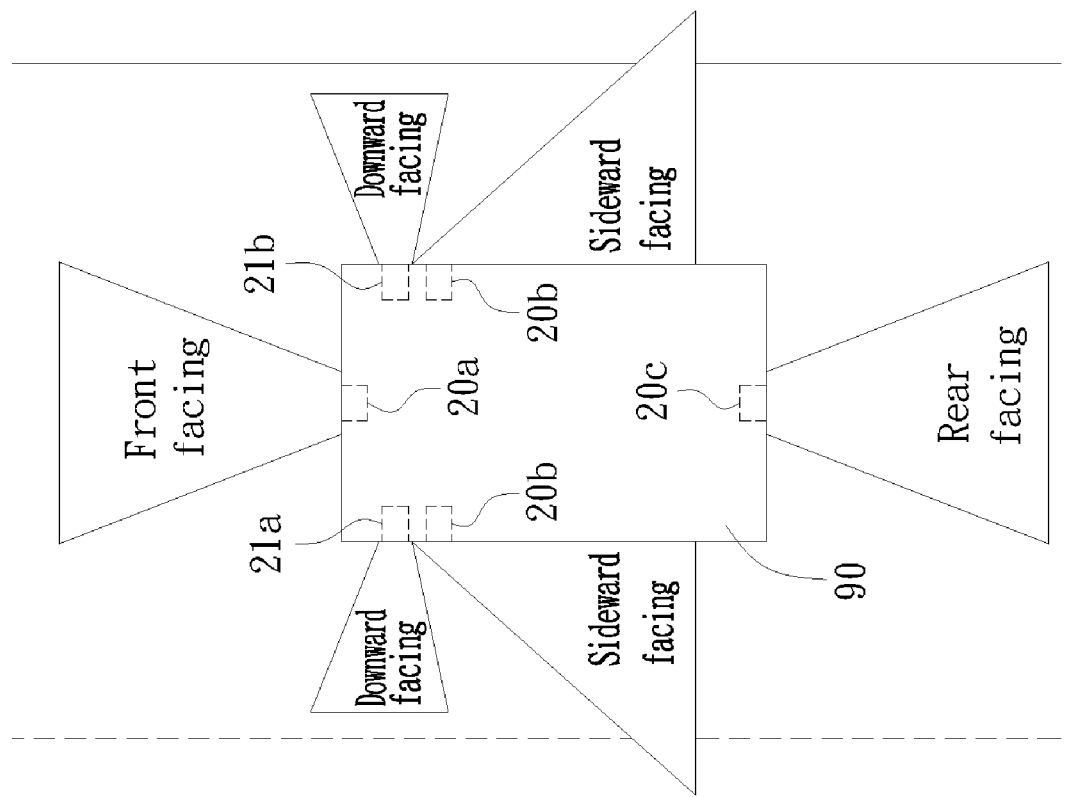
FIG. 4B is a top view of a lane departure warning apparatus of the invention, being adapted for a vehicle.

Please refer to FIG. 4A and FIG. 4B, which are respectively a side view and a top view of a lane departure warning apparatus of the invention, being adapted for a vehicle. In this preferred embodiment, there are four first information acquisition units 20, respectively being arranged at the front, the two sides and the rear of a vehicle 90 to be used for acquire images surrounding the vehicle 90. That is, a first information acquisition unit 20a is arranged at front, two first information acquisition units 20b are arranged at the two sides in respective, and a first information acquisition unit 20c is arranged at rear. It is noted that the four first information acquisition units 20 are only used as illustration and thus the number of the first information acquisition unit 20 is not limited thereby. Moreover, the four first information acquisition units 20 will transmit images acquired thereby to the information processing/controlling unit 22 for processing and identification so as to evaluate distances between the vehicle and traffic lanes.

Moreover, as seen in FIG. 4A and FIG. 4B, there are two second information acquisition units 21a and 21b being arranged at the bottom of the vehicle 90 for acquiring information relating to the ambient of the vehicle's bottom. In this preferred embodiment, the two second information acquisition units 21a and 21b are respectively arranged at the two opposite sides of the vehicle 90 for acquiring images under the vehicle 90. In a preferred aspect, each second information acquisition unit 21 can be a camcorder configuring with an image capturing device selected from the group consisting of a charge-coupled device (CCD) and a complementary metal-oxide semiconductor (CMOS). In addition, the second information acquisition unit 21 can be an infrared image capturing device, further comprising an infrared projector and an infrared sensor. Thus, each second information acquisition unit 21 is able to capture images under the bottom of the vehicle 90 and then transmit the captured imaged to the information processing/controlling unit 22 for processing and identification so as to determine whether the vehicle 90 is pressing on traffic lanes.

In FIG. 3, the information processing/controlling unit 22 is coupled to each first information acquisition unit 20 and each second information acquisition unit 21, and is capable of using an environment evaluation module 220 to evaluate brightness of ambient environment of the vehicle and thus basing upon the evaluation to select one acquired information from the group consisting of the information acquired by the at least one first information acquisition unit 20, the information acquired by the at least one second information acquisition unit 21, and the combination thereof, while processing the selected information to generate an alarm signal to be received by the alarm unit 23. In addition, the environment evaluation module 220 further comprises a brightness evaluation module 2201 and a weather status evaluation module 2202. The brightness evaluation module 2201 is used for evaluating brightness of ambient environment of the vehicle, e.g. the vehicle is being driven during daytime or nighttime. The weather status evaluation module 2202 is used for evaluating weather status of the environment surrounding the vehicle, e.g. the vehicle is being driven in a sunny day or rainy day.

In this preferred embodiment, the brightness evaluation module 2201 is able to perform an average operation upon gray levels of the image information acquired by the at least one first information acquisition unit 20 while defining a surrounding brightness according to the average operation; and the weather status evaluation module 2202 is able to determine whether or not it is raining by one means selected form the group consisting of: performing a rain drop identification using the image information acquired by the at least one first information acquisition unit 20, and measuring the wiping frequency of a windshield wiper of the vehicle using a frequency sensor. Moreover, the alarm unit 23 is capable of receiving the alarm signal and thus generate an alerting response accordingly, and the alerting response generated by the alarm unit for alerting the driver is a selected from the group consisting of a sound, a light, a shake and the combination thereof.

As seen in FIG. 3, the information processing/controlling unit 22 further comprises a communication module 221 and a memory 222. The memory is used for registering results of the lane departure evaluating process while the communication module 221 is used for transmitting those results to a control center by a wireless means, whereas all such result are monitored and recorded.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A lane departure warning method for automatically detecting lane departures of a vehicle, comprising the steps of:
    providing at least a first information acquisition unit and at least a second information acquisition unit, while enabling each of the at least one first information acquisition unit to acquire information relating to an environment surrounding the vehicle, and each of the at least one second information acquisition unit to be being disposed at the bottom of the vehicle for acquiring information relating to the ambient of the vehicle's bottom;
    using the image information acquired by the at least one first information acquisition unit to generate an image signal;
    performing an environment evaluation upon the image signal for interpreting and defining the ambient environment of the vehicle; and
    basing on the interpretation of the environment evaluation to select one acquired information from the group consisting of the information acquired by the at least one first information acquisition unit, the information acquired by the at least one second information acquisition unit, and the combination thereof while using the selected information to perform a lane departure evaluating process.

2. The method of claim 1, further comprising the step of: generating an alarm signal while the lane departure evaluating process indicate an occurrence of lane departure.

3. The method of claim 1, wherein the environment evaluation further comprises the steps of:
   evaluating the brightness of a surrounding ambient to the vehicle; and
   evaluating weather status of the environment surrounding the vehicle.

4. The method of claim 3, wherein the brightness evaluation is performed by performing an average operation upon gray levels of the image information acquired by the at least one first information acquisition unit while defining an surrounding brightness according to the average operation.

5. The method of claim 3, wherein the weather status evaluation is performed by using the image information acquired by the at least one first information acquisition unit to perform a rain drop identification.

6. The method of claim 3, wherein the weather status evaluation is performed by using a frequency sensor to measuring the wiping frequency of a windshield wiper of the vehicle.

7. The method of claim 1, wherein each of the at least one first information acquisition unit can be disposed at a position of the vehicle selected from the front of the vehicle, the rear of the vehicle, the two sides of the vehicle.

8. The method of claim 1, further comprising the steps of:
   registering results of the lane departure evaluating process; and
   transmitting the results of the lane departure evaluating process to a control center for recording.

9. The method of claim 1, wherein the lane departure evaluating process further comprises the steps of:
   while the environment evaluation indicates normal, using the image information acquired by the at least one first information acquisition unit to evaluate distances between the vehicle and traffic lanes, and using the image information acquired by the at least one second information acquisition unit to perform an evaluation for determining whether the traffic lane is pressed by the vehicle; and
   while the environment evaluation indicates abnormal, using the image information acquired by the at least one second information acquisition unit to perform an evaluation for determining whether the traffic lane is pressed by the vehicle.

10. A lane departure warning apparatus for automatically detecting lane departures of a vehicle, comprising:
   at least a first information acquisition unit, for acquiring information relating to an environment surrounding the vehicle;
   at least a second information acquisition unit, being disposed at the bottom of the vehicle for acquiring information relating to the ambient of the vehicle's bottom;
   an information processing/controlling unit, coupled to each first information acquisition unit and each second information acquisition unit, capable of using an environment evaluation module to evaluate brightness of ambient environment of the vehicle and thus basing upon the evaluation to select one acquired information from the group consisting of the information acquired by the at least one first information acquisition unit, the information acquired by the at least one second information acquisition unit, and the combination thereof, while processing the selected information to generate an alarm signal; and
   an alarm unit, capable of receiving the alarm signal and thus generate an alerting response accordingly.

11. The apparatus of claim 10, wherein each of the at least one first information acquisition unit can be disposed at a position of the vehicle selected from the front of the vehicle, the rear of the vehicle, the two sides of the vehicle.

12. The apparatus of claim 10, wherein the at least one first information acquisition unit is a camcorder.

13. The apparatus of claim 12, wherein the camcorder is configured with an image capturing device selected from the group consisting of a charge-coupled device (CCD) and a complementary metal-oxide semiconductor (CMOS).

14. The apparatus of claim 10, wherein the at least one second information acquisition unit is a camcorder.

15. The apparatus of claim 14, wherein the camcorder is configured with an image capturing device selected from the group consisting of a charge-coupled device (CCD) and a complementary metal-oxide semiconductor (CMOS).

16. The apparatus of claim 10, wherein the at least one second information acquisition unit is an infrared image capturing device.

17. The apparatus of claim 16, wherein the infrared image capturing device is comprised of an infrared projector and an infrared sensor.

18. The apparatus of claim 10, wherein the alerting response generated by the alarm unit for alerting the driver is a selected from the group consisting of a sound, a light, a shake and the combination thereof.

19. The apparatus of claim 10, wherein the environment evaluation module further comprises:
   a brightness evaluation module, for evaluating brightness of ambient environment of the vehicle; and
   a weather status evaluation module, for evaluating weather status of the environment surrounding the vehicle.

20. The apparatus of claim 19, wherein the brightness evaluation module is able to perform an average operation upon gray levels of the image information acquired by the at least one first information acquisition unit while defining a surrounding brightness according to the average operation.

21. The apparatus of claim 19, wherein the weather status evaluation module is able to determine whether or not it is raining by one means selected form the group consisting of: performing a rain drop identification using the image information acquired by the at least one first information acquisition unit, and measuring the wiping frequency of a windshield wiper of the vehicle using a frequency sensor.

* * * * *